United States Patent [19]

Suutarinen

[11] Patent Number: 5,516,433

[45] Date of Patent: May 14, 1996

[54] WATER PURIFICATION PLANT AND METHOD FOR PURIFYING WATER

[76] Inventor: Oiva Suutarinen, Rysäkuja 5, 02260 Espoo, Finland

[21] Appl. No.: 204,590

[22] Filed: Mar. 1, 1994

[30] Foreign Application Priority Data

Dec. 20, 1993 [FI] Finland ................... 935722

[51] Int. Cl.⁶ ........................................... C02F 1/24
[52] U.S. Cl. ........................... 210/703; 210/221.2
[58] Field of Search ................... 210/703, 221.2, 210/221.1, 97, 109; 209/170

[56] References Cited

U.S. PATENT DOCUMENTS

| | | |
|---|---|---|
| 3,506,125 | 4/1970 | Willis . |
| 4,280,886 | 7/1981 | Sawa . |
| 4,377,485 | 3/1983 | Krofta . |
| 4,470,903 | 9/1984 | Van Leeuwen . |
| 4,626,345 | 12/1986 | Krofta . |
| 4,957,633 | 9/1990 | Suutarienen . |
| 5,064,531 | 11/1991 | Wang . |
| 5,068,031 | 11/1991 | Wang . |
| 5,069,783 | 12/1991 | Wang . |
| 5,130,029 | 7/1992 | Suutarienen . |

FOREIGN PATENT DOCUMENTS

| | | |
|---|---|---|
| 841591 | 4/1984 | Finland . |
| 146457 | 11/1979 | Japan . |
| 1710514 | 2/1992 | U.S.S.R. . |

*Primary Examiner*—Thomas M. Lithgow
*Attorney, Agent, or Firm*—Steinberg, Raskin & Davidson

[57] ABSTRACT

A water purification plant and method for purifying liquid by flotation clarification, in which pollution particles, or impurities dissolved in the liquid and brought into a particle form by flocculation chemicals, are separated from the liquid and led onto a surface of the fluid to form a bed of slurry. The slurry bed is led away into a sewer system and the purified liquid is led through an intermediate bottom of a clarification basin into a lower space of the clarification basin or directly away for additional purification or consumption. The intermediate bottom of the clarification basin is provided with elements affecting the flow such that the flow resistance occurring through the intermediate bottom is at its largest at the final end of the clarification basin and the flow resistance decreases towards the initial end of the clarification basin, whereby the entire area of the clarification basin has substantially the same, and uniform, flow volume.

20 Claims, 2 Drawing Sheets

WATER PURIFICATION PLANT AND METHOD FOR PURIFYING WATER

BACKGROUND OF THE INVENTION

The present invention relates to a water purification plant for purifying liquid by flotation clarification, in which pollution particles, or the impurities dissolved in the liquid and brought into a particle form by means of flocculation chemicals, are separated from the liquid to the purified, float to the top surface of the liquid and are then led on the surface into a slurry bed. The slurry bed is directed away into a sewer system or the like and the purified liquid is led through an intermediate bottom, or the like arranged in a lower part of clarification basin, into a lower space of the clarification basin or directly away for additional purification or consumption. When waste water is the liquid being purified, the purified water can be directed back to the environment.

The flotation method has proved to be the best and most efficient water purification method for chemically purifying lakes, rivers and other water reservoirs as well as iron-bearing and polluted groundwaters. Similarly, it is the most efficient chemical purification method for waste waters, especially when very difficult and complex industrial waste waters and preliminary and/or final purification stages of waste water is involved. concerned.

When purifying water or waste water, it is a prevailing fact that the constructions of the purification systems and basins are large and expensive. In cold climates, the purification system and basin have to be protected by means of normal heatable house structures.

In Finnish Patent Application No. FI 841591, a method for purifying a fluid by means of flotation clarification is described. In this method, the pollution particles, or the impurities dissolved in the fluid and brought into a particle form by means of flocculation chemicals, are separated from the fluid to the purified and led onto the surface of the fluid as a slurry bed. The slurry bed is led away into a sewer system or the like and the purified fluid is led via a bottom portion of the clarification basin through a bottom therein for consumption, or when waste water is involved, the purified fluid is directed e.g., back to the environment. In this method, the purified fluid flows down in the clarification basin after a runoff channel within the area of the entire clarification basin, including the basin region adjacent to the runoff channel, by means of an edge circulating around the clarification basin. The purified fluid flows from below the edge and the flow of the purified fluid is extremely uniform within the area of the entire clarification basin. The pollution particles rise up immediately and accumulate on the surface of the clarification basin in the entire clarification basin.

OBJECTS AND SUMMARY OF THE INVENTION

Accordingly, it is an object of the present invention to provide a water purification plant having a size as small as possible by utilizing the entire basin by flotation clarification without any type of slanting or straight flows. This type of arrangement has not been possible in the purification plant solutions in the prior art.

It is another object of the present invention to provide and new and improved purification plant and method for purifying a liquid in a clarification basin in which the flow resistance of a bottom element in the basin is regulated such that there is a higher flow resistance at an end portion of the element in the flow direction and a lower resistance at an initial portion in the flow direction. In this manner, the flow of liquid in the clarification basin is substantially uniform.

In order to achieve the objects stated above, and others, the water purification plant in accordance with the present invention comprises a clarification basin having an intermediate bottom provided with elements affecting the flow, also referred to as flow regulating means. The elements form the flow resistance of the intermediate bottom such that the flow resistance occurring through the intermediate bottom is at its largest at the final end of the clarification basin in the direction of the liquid flow and the flow resistance decreases towards the initial end of the clarification basin, such that the entire area of the clarification basin has substantially the same, and uniform, flow volume. The intermediate bottom acts as a barrier to regulate the flow of the purified liquid out from the clarification basin so that separated pollution particles in the slurry on the top surface of the basin are not removed along with the purified water.

In accordance with a first preferred embodiment of the invention, the clarification basin is provided with a perforated or gap-containing intermediate bottom, under which is located a pure-water space for discharging the clarified water. To provide the flow regulating means, the dimensions of the holes or gaps of the intermediate bottom are smaller at the final end of the flotation clarification basin than at its initial end, or the distances of the holes decrease towards the initial end of the basin. In this manner, the flow resistance occurring through the intermediate bottom is largest at the final end of the intermediate bottom, and thereby also of the entire flotation basin, than at the initial end, and decreases in a direction toward the initial end, whereby the entire area of the intermediate bottom and the basin have substantially the same, and uniform, flow volume.

By means of the purification plant construction in accordance with the present invention, a surface-load value of about 30 to about 35 $m^3/m^2/h$ is reached, which is substantially higher than in prior art purification plants wherein the surface-load value is only about 10 $m^3/m^2/h$. The higher surface-load values obtained in the present invention are values suitable for purifying raw waters in the area of Finland, which is to be taken into account when comparing the results, e.g., with Central and Southern European raw waters, which may be more easily purified and the surface-load values may thereby still be increased from these values.

When the flow in the flotation clarification basin is uniform, the formation of a uniform and tight surface slurry bed is thus achieved, the removal of the slurry bed containing the pollution particles or impurities is improved and the amount of waste water decreases. In addition, it is another advantage that savings are realized in building and plant costs per fluid cubic meter to be purified, whereas the purification results still resemble the results of conventional flotation plants operating in the most efficient manner.

In the method for purifying a liquid in accordance with the invention, pollution particles are separated from the liquid, e.g., by rotating and mixing devices. A stream of the liquid carrying the pollution particles is introduced into a clarification basin at an initial end thereof and the pollution particles are caused to rise to a top surface of the liquid to form a bed of slurry which is removed from the clarification basin, e.g., at a final end at a side of the clarification basin opposite from the initial end. The purified liquid having the pollution particles separated therefrom is passed through an intermediate bottom element arranged in a lower portion of the clarification basin. The flow resistance of the intermediate bottom element is regulated to provide a larger flow resistance at the final end of the clarification basin than at the initial end of the clarification basin and a substantially constant liquid flow in the entire area of the clarification basin. The purified liquid is then removed from the clarification basin. The step of regulating the flow resistance comprises providing plates having holes therein, pipes having holes therein, porous plates or porous pipes in the intermediate bottom element. The size of the holes in the pipes or plates can be regulated to provide smaller holes at the final end of the clarification basin than at the initial end of the clarification basin. In a preferred embodiment, the holes are arranged in rows in a direction substantially transverse to a direction of the flow of the liquid, and the distance between successive rows at the final end of the clarification basin is arranged to be larger than the distance between successive rows at the initial end of the clarification basin. In addition, or instead, it is possible to arrange fewer holes in rows at the final end of the clarification basin than in rows at the initial end of the clarification basin.

The present invention is next described in detail with reference to certain preferred embodiments of the invention shown in the figures of the drawing. However, the present invention is, however, not solely limited to these illustrated embodiments.

BRIEF DESCRIPTION OF THE DRAWINGS

The following drawings are illustrative of embodiments of the invention and are not meant to limit the scope of the invention as encompassed by the claims.

DETAILED DESCRIPTION OF THE INVENTION

Figure 1:
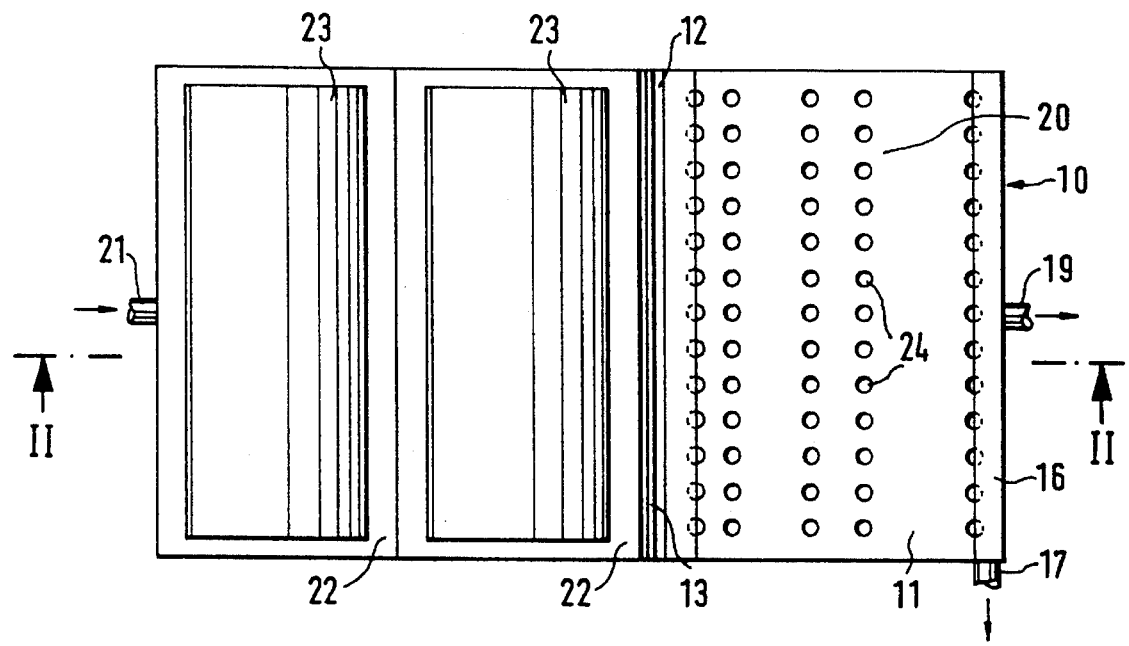
FIG. 1 shows a top view of a first preferred embodiment of a flotation clarification basin used in a water purification plant and method in accordance with the present invention.
Figure 2:
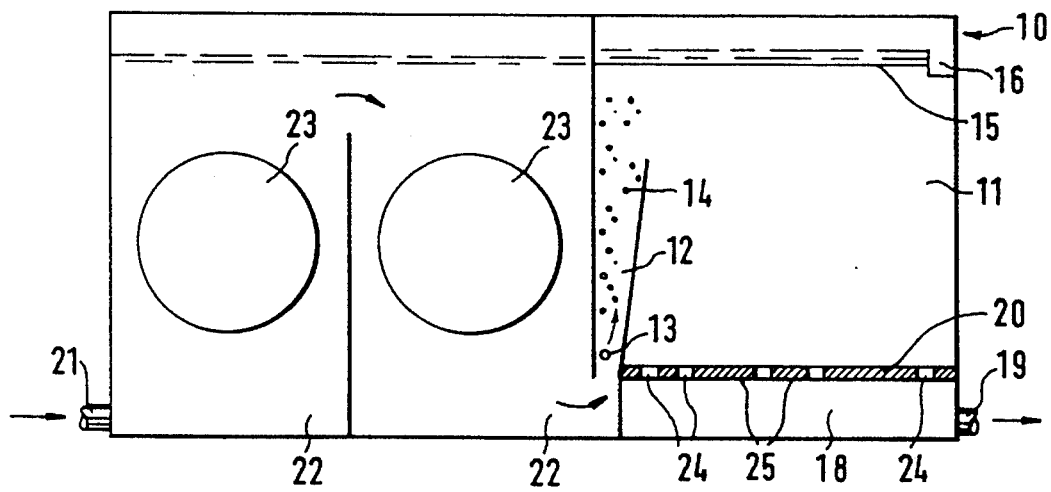
FIG. 2 shows a section view taken along the line II—II of FIG. 1.

Referring to FIGS. 1 and 2, a flotation clarification plant is generally referred to by numeral 10. The plant 10 comprises a clarification basin 11 and an intermediate bottom element 20 arranged therein. The clarification process occurs in the clarification basin 11. The plant 10 additionally comprises a feed water pipe 21 through which the liquid to be purified flows into a mixing space 22 in which, e.g., rotating and mixing devices 23 are operate. By means of these rotating and mixing devices, and/or by the action of chemicals added to the entering raw water or some other liquid to be purified, the impurities form into flocs, i.e., conglomerate or aggregate into small clusters, and the flocculated water thus formed flows from the mixing space 22 into a runoff channel 12. If the liquid to be purified is water containing fibers, the fibers might be separated from the water upon contact with the water so that a mixing space would not be needed.

A water-air mixture is added to the liquid to be purified in the runoff channel 12 via a pipe 13 and, possibly, via nozzles located therein. In the water-air mixture, air occurs as microscopically small bubbles which are then distributed along the entire width of the basin 11. The air bubbles adhere to pollution particles 14 in the runoff channel 12, which is dimensioned correctly from the standpoint of adequate flow properties, and convey them onto the surface of the liquid to be purified at an initial end of the clarification basin. On the surface, the particles 14 spread along the entire region of the basin to the final end of the clarification basin opposite from the initial end. As the waste and pollution particles accumulate on the surface of the basin 11, they form a slurry bed 15, which is removed at suitable intervals into a sewer trough 16, and directed therefrom further into a sewer pipe 17.

The clarified liquid flows in the clarification basin 11 downwards through the intermediate bottom 20 and further into a pure-water intermediate space 18 located under the intermediate bottom 20. From the intermediate space 18, the purified or clarified water is directed via a discharge pipe 19 out of the clarification plant.

The intermediate bottom 20, or a corresponding and similar structure, may comprise one or more unitary members such as plates 25 provided with holes 24 or gaps, pipes provided with holes 24, porous plates or pipes or some other corresponding unitary members. It is important though that the hole spacing and the dimensions of the holes 24 or apertures in corresponding applications are dimensioned such that the flow in the bottom portion of the clarification basin 11 is substantially uniform within the entire area of the basin 11. The plates 25 with holes 24 or similar structure thus constitute flow regulating means which regulate the flow of the liquid being removed from the clarification basin and thus the flow of the water in the entire clarification basin as desired, e.g., substantially uniform. As shown in FIGS. 1 and 2, the concentration of holes 24 in the initial part of the intermediate bottom element 20 is greater than the concentration of holes in the final part of the bottom element 20 to provide a lesser flow resistance in the initial part than the final part.

Figure 3:
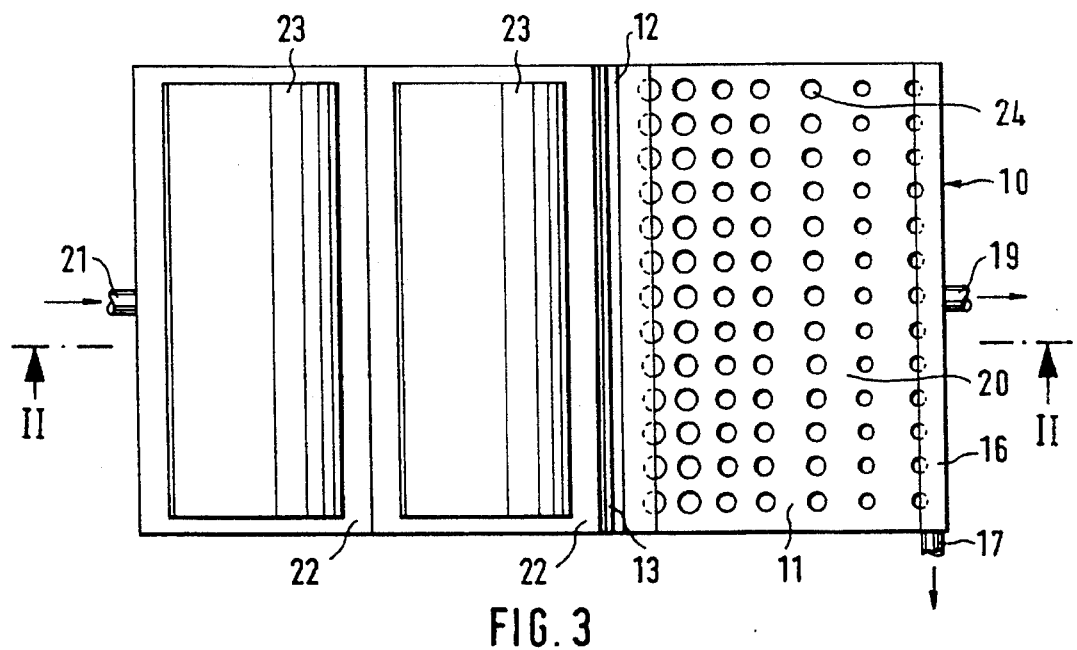
FIG. 3 shows a top view of a second preferred embodiment of a water purification plant in accordance with the present invention, and in which the method of the present invention can be utilized.

In the embodiment shown in FIG. 3, wherein the same reference numerals are used to denote the same elements described above with respect to FIGS. 1 and 2, the size of the holes 24 in the intermediate bottom increases towards the initial end of the clarification basin 11. The distance between the rows of holes also decreases in a direction toward the initial end of the clarification basin 11, i.e., the distance between successive rows of holes in the flow direction. Thus, the size of the holes 24 is one parameter used to regulate the flow resistance provided by the intermediate bottom element 20.

Figure 4:
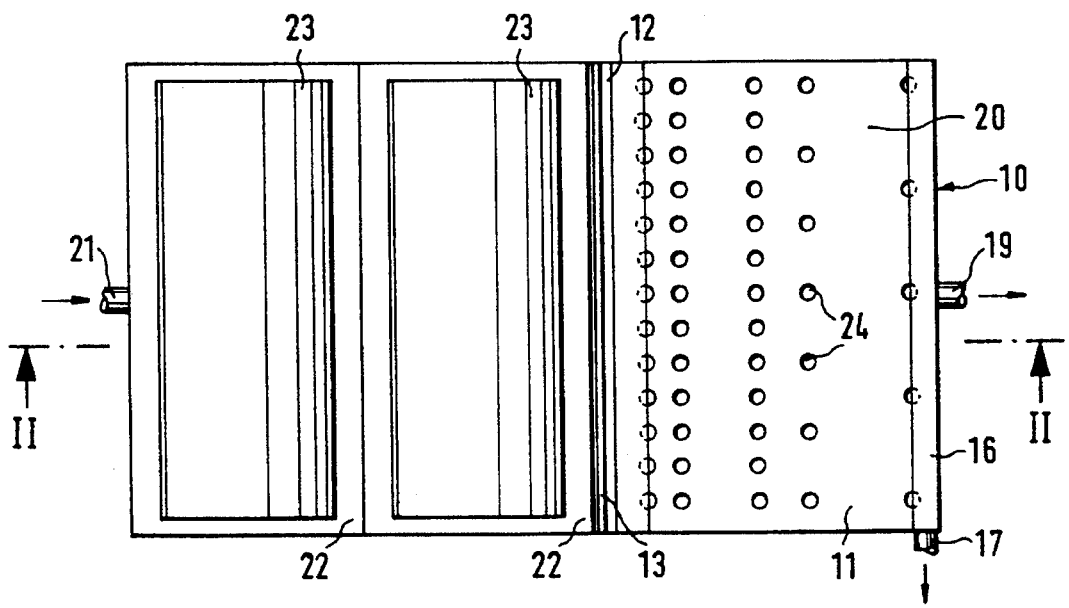
FIG. 4 shows a top view of a third preferred embodiment of a water purification plant in accordance with the present invention, and in which the method of the present invention can be utilized.

In the embodiment shown in FIG. 4, the distance between the rows of holes decreases in a direction toward the initial end of clarification basin 11, and furthermore, the number of the holes 24 may decrease towards the final end of the clarification basin 11. In this manner, the number of holes can be used as an additional parameter for regulating the flow resistance provided by the intermediate bottom element 20.

The examples provided above are not meant to be exclusive. Many other variations of the present invention would be obvious to those skilled in the art, and are contemplated to be within the scope of the appended claims.

I claim:

1. In a fluid purification plant for purifying fluid by flotation clarification, in which pollution particles, or impurities dissolved in the liquid and brought into a particle form by means of flocculation chemicals, are removed from the fluid and led onto the surface of the liquid to form a bed of slurry, the improvement comprising a clarification basin having an initial end and a final end at a side opposite from said initial end, a run-off channel from which fluid to be purified is passed into said initial end of said clarification basin, an intermediate bottom wall arranged in a plane in a lower portion of said clarification basin, the purified liquid from which the pollution particles have been removed passing downwardly through said intermediate bottom wall, and liquid outlet means for removing the purified liquid from said clarification basin after it has passed through said intermediate bottom wall, said intermediate bottom wall comprising flow resistance regulating means for varying the rate of flow of liquid through said intermediate bottom wall at respective regions of said intermediate bottom wall as a function of the location of each region relative to said initial end of said clarification basin, said flow resistance regulating means being arranged in said intermediate bottom wall such that the largest flow resistance therethrough is provided in a portion of said intermediate bottom wall at said final end of said clarification basin and the flow resistance decreases in a direction toward said initial end of said clarification basin to thereby provide a substantially uniform flow in said lower portion of said clarification basin.

2. The liquid purification plant of claim 1, wherein said flow resistance regulating means comprise plates having holes therein.

3. The liquid purification plant of claim 2, wherein the size of holes in said plates at said final end of said clarification basin is smaller than the size of holes in said plates at said initial end of said clarification basin.

4. The liquid purification plant of claim 2, wherein said holes are arranged in rows in a direction substantially transverse to a direction of the flow of the fluid, the distance between successive rows of holes at said final end of said clarification basin being larger than the distance between successive rows of holes at said initial end of said clarification basin.

5. The liquid purification plant of claim 2, wherein said holes are arranged in rows in a direction substantially transverse to a direction of the flow of the fluid, said rows situated in proximity to said initial end having a larger amount of holes than rows situated in proximity to said final end of said clarification basin.

6. The liquid purification plant of claim 1, wherein the liquid to be purified is water containing impurities.

7. The liquid purification plant of claim 1, wherein said intermediate bottom wall comprises at least one unitary member, said flow resistance regulating means varying the rate of flow of liquid through each of said at least one unitary member at respective regions of said at least one unitary member as a function of the location of each region relative to said initial end of said clarification basin.

8. The liquid purification plant of claim 1, wherein said flow resistance regulating means comprise a single plate having holes therein.

9. The liquid purification plant of claim 8, wherein the size of holes in said plate at said final end of said clarification basin is smaller than the size of holes in said plate at said initial end of said clarification basin.

10. The water purification plant of claim 9, wherein said holes are arranged in rows in a direction substantially transverse to a direction of the flow of the liquid, the distance between successive rows of holes at said final end of said clarification basin being larger than the distance between successive rows of holes at said initial end of said clarification basin.

11. The water purification plant of claim 9, wherein said holes are arranged in rows in a direction substantially transverse to a direction of the flow of the liquid, said rows situated in proximity to said initial end having a larger amount of holes than rows situated in proximity to said final end of said clarification basin.

12. A liquid purification plant for purifying a liquid, comprising a clarification basin having an initial end and a final end at a side opposite from said initial end, a run-off channel from which liquid to be purified is passed into said initial end of said clarification basin, pollution particles being separated from the liquid by flotation clarification and led onto a top surface of the liquid in said clarification basin to form a bed of slurry, means for removing the slurry bed from said clarification basin, an intermediate bottom wall arranged in a plane in lower portion of said clarification basin, the purified liquid from which the pollution particles have been removed passing downwardly through said intermediate bottom wall, and liquid outlet means for removing the purified liquid from said clarification basin after it has passed through said intermediate bottom wall, said intermediate bottom wall comprising flow resistance regulating means for varying the rate of flow of liquid through said intermediate bottom wall at respective regions of said intermediate bottom wall as a function of the location of each region relative to said initial end of said clarification basin, said flow resistance regulating means being arranged in said intermediate bottom wall such that the largest flow resistance therethrough is provided in a portion of said intermediate bottom wall at said final end of said clarification basin and the flow resistance decreases in a direction toward said initial end to provide a substantially uniform flow in said lower portion of said clarification basin.

13. The liquid purification plant of claim 12, wherein said flow resistance regulating means comprise plates having holes therein.

14. The liquid purification plant of claim 12, wherein the size of said holes in said plates is smaller at said final end of said clarification basin than at said initial end of said clarification basin.

15. The liquid purification plant of claim 14, wherein said holes are arranged in rows in a direction substantially transverse to a direction of the flow of the fluid, the distance between successive rows at said final end of said clarification basin being larger than the distance between successive rows at said initial end of said clarification basin.

16. The liquid purification plant of claim 14, wherein said holes are arranged in rows in a direction substantially transverse to a direction of the flow of the fluid, said rows situated in proximity to said initial end having a larger amount of holes than rows situated in proximity to said final end of said clarification basin.

17. A method for purifying a liquid, comprising the steps of:

introducing a liquid containing pollution particles from a runoff channel into a clarification basin at an initial end thereof, separating the pollution particles from the liquid by flotation clarification, causing the pollution particles to rise to a top surface of the liquid in a clarification basin to form a bed of slurry, removing the bed of slurry from the clarification basin, passing purified liquid from which pollution particles have been removed downwardly through an intermediate bottom wall arranged in a plane in the clarification basin, varying the rate of flow of liquid through the intermediate bottom wall at respective regions of the intermediate bottom wall as a function of the location of each region relative to the initial end of the clarification basin, constructing the intermediate bottom wall to provide a larger flow resistance therethrough in a portion of said intermediate bottom wall at a final end of the clarification basin opposite from the initial end than at the initial end to provide a substantially uniform flow in a lower portion of the clarification basin, and removing the purified liquid from the clarification basin at a liquid outlet location after it has passed through the intermediate bottom wall.

18. The method of claim 17, wherein the step of varying the rate of flow of fluid through the intermediate bottom element comprises providing plates having holes therein.

19. The method of claim 18, further comprising the step of regulating the size of the holes in the plates to provide smaller holes at the final end of the clarification basin than at the initial end of the clarification basin.

20. The method of claim 18, further comprising the steps of arranging the holes in rows in a direction substantially transverse to a direction of the flow of the liquid, and providing the distance between successive rows at the final end of the clarification basin to be larger than the distance between successive rows at the initial end of the clarification basin.

* * * * *